United States Patent
Mente et al.

(10) Patent No.: US 6,451,101 B1
(45) Date of Patent: Sep. 17, 2002

(54) PARTING AGENT FOR AN ISOCYANATE WOOD BINDER

(75) Inventors: Donald C. Mente, Grosse Ile; Li-Mei Lu, Canton; David D. Peters, Wyandotte; Joe C. Wilson, Woodhaven; Anthony G. Schaefer, Wyandotte, all of MI (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 09/751,008

(22) Filed: Dec. 29, 2000

(51) Int. Cl.$^7$ ................................................ C08G 18/30
(52) U.S. Cl. .................. 106/38.25; 528/49; 252/182.2; 560/25; 516/203; 556/414
(58) Field of Search ........................ 528/49; 252/182.2; 560/25; 106/38.25; 516/203; 556/414

(56) References Cited

U.S. PATENT DOCUMENTS

| | | | |
|---|---|---|---|
| 3,870,665 A | 3/1975 | Diehr et al. | |
| 3,919,279 A | 11/1975 | Rosenthal et al. | 260/453 P |
| 3,962,302 A | 6/1976 | Rosenthal et al. | 260/453 P |
| 4,100,328 A | 7/1978 | Gallagher | 428/407 |
| 4,257,995 A | 3/1981 | McLaughlin et al. | 264/122 |
| 4,257,996 A | 3/1981 | Farrissey, Jr. et al. | 264/122 |
| 4,320,208 A | 3/1982 | Reischl et al. | |
| 4,344,798 A | 8/1982 | Gaul et al. | 106/123 LC |
| 4,373,083 A * | 2/1983 | Seiner et al. | |
| 4,407,771 A | 10/1983 | Betzner et al. | |
| 4,433,120 A | 2/1984 | Chiu | |
| 4,490,517 A | 12/1984 | Fuzesi et al. | 527/401 |
| 4,742,144 A | 5/1988 | Nguyen et al. | 528/26.5 |
| 4,822,850 A * | 4/1989 | Yashuda et al. | |
| 4,983,338 A | 1/1991 | Schucker | 264/45.1 |
| 4,999,390 A | 3/1991 | Bentsen | |
| 5,002,713 A | 3/1991 | Palardy et al. | |
| 5,096,945 A | 3/1992 | Sun | |
| 5,120,812 A | 6/1992 | O'Lenick, Jr. et al. | 528/28 |
| 5,151,238 A | 9/1992 | Earl et al. | |
| 5,283,311 A | 2/1994 | Narayan et al. | 528/49 |
| 5,554,438 A | 9/1996 | Marcinko et al. | 428/306.6 |
| 5,574,122 A * | 11/1996 | Yeske et al. | |
| 5,637,639 A | 6/1997 | Duan et al. | |
| 5,660,763 A | 8/1997 | Uhlig | |
| 5,977,398 A * | 11/1999 | Komiya | |
| 6,086,998 A | 7/2000 | Wihsmann et al. | |

FOREIGN PATENT DOCUMENTS

| | | | |
|---|---|---|---|
| EP | 0008723 | 3/1980 | C08L/55/02 |
| EP | 0129430 | 12/1984 | B27N/3/02 |
| EP | 0207192 | 1/1987 | B29C/33/64 |
| WO | WO 9814425 | 4/1998 | C07C/63/16 |
| WO | WO 9904943 | 2/1999 | B27N/3/04 |

OTHER PUBLICATIONS

Hans–Joachim Deppe; "Technical Progress in Using Isocyanate as an Adhesive in Particleboard Manufacture"; *Proceedings of Eleventh Washington State University Symposium on Particleboard* (Mar. 1977); Pullman, Washington; pp. 13–31.

* cited by examiner

Primary Examiner—Rachel Gorr
(74) Attorney, Agent, or Firm—Fernando A. Borrego

(57) ABSTRACT

There is disclosed a parting agent comprising the reaction product of an isocyanate compound and an isocyanate-reactive compound of the general structure $$R\text{-(ao)}_n\text{-Y}$$

wherein: R is a hydrophobic group containing alkyl, alkaryl, polyaryl, or siloxane moieties; (ao) is an alkylene oxide or mixture of alkylene oxides such as ethylene oxide, propylene oxide, butylene oxide, and mixtures thereof; n is about 1 to about 25; and Y represents a monofunctional isocyanate-reactive group. There is also disclosed the processes that may be utilized to produce the parting agent.

6 Claims, No Drawings

US 6,451,101 B1

PARTING AGENT FOR AN ISOCYANATE WOOD BINDER

FIELD OF THE INVENTION

The present invention relates to a parting agent for use with isocyanate wood binder resins and the processes of producing the parting agent. The parting agent can be used with isocyanate wood binder resins that can optionally include synergists such as C1 to C4 N-alkyl pyrrolidones or gamma-butyrolactone.

BACKGROUND OF THE INVENTION

A common disadvantage of the use of isocyanate binder resins is their poor mold or press release properties, which can lead to problems during manufacture of the lignocellulosic articles when the mold parts or press parts stick to the articles.

To overcome the sticking, it is desirable to use a parting agent either internally as a component of the binder resin, or externally by applying it to the mold or press parts between runs. External parting or release agents are less preferred because their use involves the extra step of applying the agents to the mold or press parts. Also it can be difficult to ensure complete coverage of the mold or press parts by the parting agent.

It is therefore, an object of the present invention to provide a parting agent for an isocyanate binder resin, which will not only display the desired parting properties but will also be compatible with the isocyanate binder resin.

SUMMARY OF THE INVENTION

There is provided according to a first embodiment of the present invention a parting agent, comprising the reaction product of an isocyanate compound and an isocyanate-reactive compound of the general structure

$R\text{-}(ao)_n\text{-}Y$ wherein: R is a hydrophobic group containing alkyl, alkaryl, polyaryl, or siloxane moieties, wherein the alkyl moieties comprise straight chain or branched hydrocarbons with 6 or more carbon atoms, the alkaryl moieties comprise monoalkyl, dialkyl, or trialkyl substituted aromatic hydrocarbons with 9 or more carbon atoms, the polyaryl moieties comprise a polyphenyl structure that is either alkyl substituted or unsubstituted, and the siloxane moieties comprise a trisiloxane or higher polysiloxane; (ao) is an alkylene oxide or mixture of alkylene oxides selected from the group consisting of ethylene oxide, propylene oxide, butylene oxide, and mixtures thereof; n is from 2 to 25; and Y represents a monofunctional isocyanate-reactive group.

In a second embodiment, a process for producing a parting agent comprises the step of providing an isocyanate compound and an isocyanate-reactive compound of the general structure $R\text{-}(ao)_n\text{-}Y$ wherein: R is a hydrophobic group containing alkyl, alkaryl, polyaryl, or siloxane moieties and wherein the alkyl moieties comprise straight chain or branched hydrocarbons with 6 or more carbon atoms, the alkaryl moieties comprise monoalkyl, dialkyl, or trialkyl substituted aromatic hydrocarbons with 9 or more carbon atoms, the polyaryl moieties comprise a polyphenyl structure that is either alkyl substituted or unsubstituted, and the siloxane moieties comprise a trisiloxane or higher polysiloxan; (ao) is an alkylene oxide or mixture of alkylene oxides selected from the group consisting of ethylene oxide, propylene oxide, butylene oxide, and mixtures thereof; n is from about 1 to about 25; and Y represents a monofunctional isocyanate-reactive group. A second step comprises reacting the isocyanate compound and the isocyanate reactive compound for a time sufficient to react out substantially all of the isocyanate groups.

In a third embodiment a process for producing a parting agent comprises the step of providing an isocyanate compound and an isocyanate-reactive compound of the general structure $R(ao)_n Y$ in stoichiometrically equivalent amounts, wherein: R is a hydrophobic group containing alkyl, alkaryl, polyaryl, or siloxane moieties and wherein the alkyl moieties comprise straight chain or branched hydrocarbons with 6 or more carbon atoms, the alkaryl moieties comprise monoalkyl, dialkyl, or trialkyl substituted aromatic hydrocarbons with 9 or more carbon atoms, the polyaryl moieties comprise a polyphenyl structure that is either alkyl substituted or unsubstituted, and the siloxane moieties comprise a trisiloxane or higher polysiloxane; (ao) is an alkylene oxide or mixture of alkylene oxides selected from the group consisting of ethylene oxide, propylene oxide, butylene oxide, and mixtures thereof; n is from about 1 to about 25; and Y represents a monofulnctional isocyanate-reactive group. The subsequent steps comprise reacting the isocyanate compound and the isocyanate reactive-compound at a first temperature until the isocyanate number is at an intermediate level; thereafter, adding a second charge of an isocyanate compound; and reacting the second charge of isocyanate compound and the isocyanate reactive-compound at a second temperature higher than the first temperature for a time sufficient to react substantially all of the isocyanate groups,.

In a fourth embodiment a process for producing a parting agent comprises the step of providing an isocyanate compound and an isocyanate-reactive compound of general structure $R(ao)_n\text{-}Y$ wherein: R is a hydrophobic group containing alkyl, alkaryl, polyaryl, or siloxane moieties and wherein the alkyl moieties comprise straight chain or branched hydrocarbons with 6 or more carbon atoms, the alkaryl moieties comprise monoalkyl, dialkyl, or trialkyl substituted aromatic hydrocarbons with 9 or more carbon atoms, the polyaryl moieties comprise a polyphenyl structure that is either alkyl substituted or unsubstituted, and the siloxane moieties comprise a trisiloxane or higher polysiloxane; (ao) is an alkylene oxide or mixture of alkylene oxides selected from the group consisting of ethylene oxide, propylene oxide, butylene oxide, and mixtures thereof; n is from about 1 to about 25; and Y represents a monofunctional isocyanate-reactive group in amounts such that the molar ratio of the isocyanate compound to $R(ao)_n\text{-}Y$ is greater than 1:1. Subsequent steps comprise reacting the two compounds at a first temperature until substantially all of the $R(ao)_n\text{-}Y$ has reacted; thereafter, reacting at a second temperature higher than the first temperature until substantially all of the excess isocyanate groups have reacted.

DETAILED DESCRIPTION OF THE PREFERRED EMBODIMENTS OF THE INVENTION

The present invention teaches a parting agent, which comprises the reaction production of an isocyanate compound and an isocyanate-reactive compound.

The isocyanate compounds useful in the present invention comprise the organic di- and polyisocyanates, modified isocyanates, isocyanate-terminated prepolymers, and mixtures of these isocyanates, all described below.

The isocyanate compound which may be used includes aliphatic, alicyclic and aromatic polyisocyanates characterized by containing two or more isocyanate groups. Such polyisocyanates include the diisocyanates and higher functionality isocyanates, particularly the aromatic polyisocyanates. Mixtures of polyisocyanates may also be used and include, crude mixtures of di- and higher functionality polyisocyanates produced by phosgenation of aniline-formaldehyde condensates or as prepared by the thermal decomposition of the corresponding carbamates dissolved in a suitable solvent, as described in U.S. Pat. No. 3,962,302 and U.S. Pat. No. 3,919,279, the disclosures of which are incorporated herein by reference, both known as crude diphenylmethane diisocyanate (MDI) or polymeric MDI.

The organic polyisocyanate may be an isocyanate-terminated prepolymer prepared by reacting, an excess of a polyisocyanate with a polyol which, on a polyisocyanate to polyol basis, may range from about 20:1 to 2:1. The polyols include, for example, polyethylene glycol, polypropylene glycol, diethylene glycol monobutyl ether, ethylene glycol monoethyl ether, triethylene glycol, etc., as well as glycols or polyglycols partially esterified with carboxylic acids including all polyester polyols, and all polyether polyalkylene polyols. Such polyols are well known in the art and will not be further described.

The isocyanate compound may also be modified isocyanates, such as, carbodiimides, allophanates, isocyanurates, and biurets.

Also illustrative of the di- or polyisocyanates which may be employed are, for example: toluene-2,4- and 2,6-diisocyanates or mixtures thereof; diphenylmethane-4,4'-diisocyanate and diphenylmethane-2,4'-diisocyanate or mixtures of same, the mixtures preferably containing about 10 parts by weight 2,4'-MDI or higher, making them liquid at room temperature; polymethylene polyphenyl isocyanates; naphthalene-1,5-diisocyanate; 3,3'-dimethyl diphenylmethane-4,4'-diisocyanate; triphenyl-methane tri-isocyanate; hexamethylene diisocyanate; 3,3'-ditolylene-4,4-diisocyanate; butylene 1,4-diisocyanate; octylene-1,8-diisocyanate; 4-chloro-1,3-phenylene diisocyanate; 1,4-, 1,3-, and 1,2-cyclohexylene diisocyanates and; in general, the polyisocyanates disclosed in U.S. Pat. No. 3,577,358, the disclosure of which is incorporated herein by reference. Preferred polyisocyanates include 2,4'-MDI, 4,4'-MDI, 2,2'-MDI, polymeric MDI, and mixtures thereof.

Typical of the suitable polyisocyanates are those sold under the trademark Lupranate® by BASF Corporation. For example, Lupranate® MI, an isomeric blend of 2,4' and 4, 4' MDI isomers, or Lupranatee® M20 SB, a polymeric MDI.

The isocyanate-reactive compound can be represented by the general structure $R(ao)_nY$. Here Y represents a monofunctional group which is reactive with isocyanates. Examples include monoalkylamino and hydroxyl, with hydroxyl being preferred. In the structure above, (ao) represents an alkylene oxide or mixture of alkylene oxides selected from the group consisting of ethylene oxide, propylene oxide, butylene oxide, and mixtures thereof; n refers to the number of alkylene oxide units in the isocyanate-reactive compound. It is conventional to use the symbol $(ao)_n$ to represent a polyoxyalkylene chain comprising, on average, n repeating units of alkylene oxide. In the invention, a preferred alkylene oxide is ethylene oxide. The variable n can be integer or non-integer and is in general from about 1 to about 25, more preferably from about 2 to about 25, and most preferably from about 3 to about 10.

In the isocyanate reactive compound $R-(ao)_n-Y$, R represents a hydrophobic group. The hydrophobic group is based either on hydrocarbons or on silicon-containing compounds.

Preferred hydrocarbon hydrophobic groups include in general those containing alkyl, alkaryl or polyaryl moieties. Alkyl moieties useful in the invention include those with about 6 or more carbon atoms. Examples are hexyl, octyl, nonyl, decyl, dodecyl, and hexadecyl. Useful alkaryl moieties include the aryl hydrocarbons such as alkaryl, dialkaryl, and trialkaryl hydrocarbons, wherein the alkyl groups contain at least about 3 carbon atoms. Together with the 6 carbon atoms of the aromatic ring, there are thus 9 or more carbon atoms in the preferred alkaryl, dialkaryl, and trialkaryl hydrocarbons. Examples include octylphenyl, hexylphenyl, nonylphenyl, dioctylphenyl, dinonylphenyl, trioctylphenyl, trinonylphenyl, and trialkarylphenyl groups. Particularly preferred are the alkaryl and dialkaryl groups such as nonylphenyl and dinonylphenyl. The polyaryl compounds have the general structure of a polyphenyl structure that is either alkyl substituted or unsubstituted. Thus in the present specification and claims the term polyaryl means a polyphenyl structure that is either alkyl substituted or unsubstituted.

Examples of isocyanate-reactive compounds useful in the invention thus include alcohol alkoxylates, alkylphenol alkoxylates, and dialkylphenol alkoxylates. Examples of alcohol alkoxylates include the fatty alcohol ethoxylates which are made by adding 2–20 units of ethylene oxide onto a $C_6-C_{18}$ straight chain or branched alcohol. These are available commercially, for example, under the Iconol® trademark from BASF Corporation. Examples of useful alkylphenol alkoxylates include those made from alkylphenols having three or more carbons in the alkyl chain attached to the phenol ring. Commonly available commercial alkylphenol alkoxylates include octylphenol ethoxylates and nonylphenol ethoxylates which are made by adding about 2 to about 20 units of ethylene oxide to octylphenol or nonylphenol. They are sold, for example, under the tradenames Iconol® OP and Iconol® NP by BASF Corporation. Similarly, dialkylphenol ethoxylates are useful in the invention. Examples are alkoxylates of those dialkylphenols or trialkylphenols having three or more carbon atoms in each alkyl group. Especially preferred are the ethoxylates of dialkyl- or trialkylphenols made by adding about 2 to about 20 units of ethylene oxide to, for example, a dialkylphenol such as dioctylphenol or dinonylphenol. Dinonylphenol ethoxylates are available commercially from BASF Corporation under the Macol® DNP tradename.

Where R represents silicon-containing compounds, the preferred hydrophobic group comprises siloxane groups. Generally preferred are the dimethylsiloxanes including trisiloxanes and higher polysiloxanes. A preferred isocyanate-reactive compound comprises a silicone compound of general structure

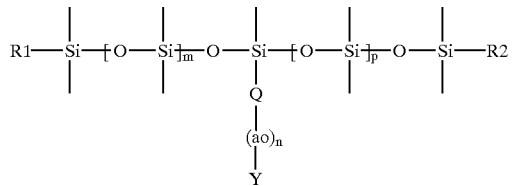

wherein Q is a bridging group of one or more atoms, m is 0–10, p is 0–10, R1 and R2 are independently alkyl or alkaryl groups containing 1 to 18 carbon atoms, (ao) is an alkylene oxide or mixture of alkylene oxides such as ethylene oxide, propylene oxide, butylene oxide, and mixtures thereof, Y represents a monofunctional isocyanate reactive group, and n is from about 2 to about 20.

Preferably R1 and R2 are alkyl groups containing 1–10 carbon atoms. More preferably, R1 and R2 contain 1–4 carbon atoms. Most preferably, R1 and R2 are methyl. R1 and R2 may be different, but it is preferred that they be the same. It is particularly preferred that R1 and R2 are both methyl. The value of m and p are preferably from 0 to 2; in a particularly preferred embodiment, m and p are both 0. When m and p are both 0, the compound is a trisiloxane. Where the sum of m and p is greater than 0, the compound is a higher polysiloxane. A particularly preferred trisiloxane containing isocyanate-reactive compound is commercially available from BASF Corporation as Masil® SF-19.

Such silicon containing isocyanate-reactive compounds can be synthesized, for example, by the reaction of R1, R2-terminated hydro-functional polysiloxane of general structure

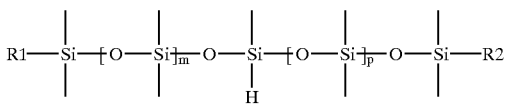

where R1, R2, m, and p have the same meaning as above, with an adduct of an unsaturated alcohol and alkylene oxides. The adduct can be prepared by reacting the unsaturated alcohol with ethylene oxide or a mixture of alkylene oxides in the presence of base catalysts. Thus, when the unsaturated alcohol is allyl alcohol, the adduct will have the general structure $CH_2=CH—CH_2-(ao)_n-OH$, where ao represents the ethylene oxide units or mixture of alkylene oxide units, and n represents the degree of alkoxylation. When the olefin of the allyl alcohol adduct reacts with the Si—H bond of the hydro-functional polysiloxane, a bridging group Q is formed consisting of the three carbon atoms of the ally alcohol portion of the adduct.

When Y of the isocyanate reactive compound comprises a hydroxyl group the reaction product will contain urethane linkages formed from the reaction of the isocyanate groups of the isocyanate compound with the hydroxyl group of the isocyanate-reactive compound. Similarly when Y comprises an alkylamino or other nitrogen containing isocyanate-reactive group, the resulting reaction product will contain urea linkages, based on the reaction of the isocyanate groups with the nitrogen of the isocyanate-reactive compound.

The parting agents of the present invention may also contain chemical modifications of the urethane or urea linkage, such as allophanates, carbodiimides, biurets, and uretonimines. In general allophanate linkages are formed by the reaction of an isocyanate group with a urethane group. Generally the allophanate reaction is carried out with special allophanate catalysts and at a temperature that is higher than that at which the urethane is formed by the reaction of an isocyanate with a hydroxyl group.

The parting agent of the present invention can be prepared or synthesized by a number of routes. In general, an isocyanate compound and an isocyanate-reactive compound of general structure $R(ao)_n Y$ are charged together into a reaction vessel. Thereafter, they are allowed to react for a time sufficient to react out substantially all of the Y groups on the isocyanate-reactive compound and all of the isocyanate groups on the isocyanate compound. Preferably there is less than 2.5% residual free NCO after the formation of the parting agent, more preferably less than 1.0% and most preferably less than or equal to 0.2% free NCO after the reaction is complete. It is desirable to have these very low levels of free NCO when using the parting agent in a binder resin for wood particles, as described below. These low levels of free NCO prevent migration of the parting agent into the wood particles. Excess isocyanate reactive compound can be tolerated because it does not present any such problem.

Where the isocyanate compound and isocyanate-reactive compound are charged in stoichiometrically equivalent amounts, there is produced a parting agent which contains either urethane linkages or urea linkages, depending on whether Y in the isocyanate-reactive compound is a hydroxyl group or an alkylamino group, respectively. For this reaction the reaction temperature is set at a temperature of about 40° C. to about 100° C. Higher or lower temperatures can also be used, but the given range provides good results. The reaction can be monitored by following the isocyanate number of the reaction product over time. The reaction can be stopped when the desired isocyanate number is reached. The reaction will proceed without catalysts. However urethane catalysts may be added to the reaction mixture. Examples of suitable catalysts include potassium octoate, zinc acetylacetonate, potassium hydroxide, and organo tin compounds.

To form parting agents which contain allophanate linkages, further steps are required. For example, after charging the isocyanate compound and the isocyanate-reactive compound in stoichiometrically equivalent amounts and reacting at a temperature of from about 40° C. to about 100° C. until the desired intermediate isocyanate number is reached, a second charge of the isocyanate compound can be added to the reaction vessel. Further reaction is then carried out at a second temperature higher than about 40° C. to about 100° C. for a period of time sufficient to react the isocyanate added in the second charge. Along with the second charge of isocyanate compound, it is generally necessary to also add a catalyst which aids in the formation of the allophanate groups. Such allophanate catalysts are known in the art and include zinc acetylacetonate, titanium tetrabutoxide, and ferric chloride. The allophanate reaction is preferably carried out at a temperature of about 100° C. to about 150° C.

An alternative method for producing parting agents containing allophanate groups is as follows. First an isocyanate compound and an isocyanate-reactive compound are charged to a reaction vessel in an amount such that the molar ratio of the isocyanate compound to $R(ao)_n Y$ is greater then 1:1, that is, such that there is a molar equivalent excess of the isocyanate compound in the reaction vessel. The mixture thus charged is then reacted at a first temperature of from about 40° C. to about 100° C. until substantially all of the $R(ao)_n Y$ has reacted. The reaction can be monitored by following the free isocyanate number during the reaction. When the desired intermediate % free NCO is reached, the mixture is then reacted at a second temperature higher than the first temperature. The reaction proceeds until substantially all of the isocyanate compound has reacted and the free NCO content of the reaction product is equal to or less than the desired level.

Although if the reaction is carried out at high temperatures for a sufficiently long time, an allophanate catalyst is not absolutely required, it is in general preferred in the last step to also add conventional allophanate forming catalysts such as those described above. The allophanate catalysts may be charged to the vessel prior to the reaction at the first temperature of from about 40° C. to about 100° C. Alternatively, the allophanate catalysts may be charged after reacting at the first temperature but prior to the reaction at the second higher temperature. In general, the allophanate catalyst and the temperature of reaction are chosen such that during the reaction of the isocyanate compound and the isocyanate-reactive compound in the first step, the temperature is lower than that required for efficient allophanate formation. In the reaction at the second temperature the temperature is high enough to efficiently convert the remaining isocyanate groups to allophanate.

Allophanates can be formed when an amount of isocyanate compound in stoichiometric excess to that of the isocyanate-reactive compound is charged to the reaction vessel. As discussed above, the charge of excess isocyanate compound can be accomplished in the first step along with the charge of isocyanate-reactive compound, where the conditions of catalysis and temperature are such that the excess isocyanate will not react further with the urethane or urea linkage being formed by the reaction of the isocyanate compound and the isocyanate-reactive compound. Alternatively, the excess isocyanate can be introduced following the reaction of stoichiometric amounts of isocyanate-reactive compound and isocyanate compound.

In either case, in general, any amount of excess isocyanate can be added to the reaction mixture. However, it is preferred in making the parting agent of the present invention to use an excess of isocyanate compound on the order of about 1 to 10 equivalent percent. That is, there should preferably be about a 1 to 10 percent excess of isocyanate groups over isocyanate-reactive groups. It can thus be seen that when parting agents of the present invention are made which contain allophanate linkages, the compositions will also in general contain urea or urethane linkages.

The parting agent and the organic di- or polyisocyanate which comprises the binder resin should be chosen such that they are compatible. That is, the two components should be readily soluble in each other, so that a single phase composition can be obtained. To this end, it is preferred that the organic di- or polyisocyanate and the isocyanate compound on which the parting agent is based should have a similar structure. Therefore, a preferred binder resin is one where the organic di- or polyisocyanate comprises an aromatic di- or polyisocyanate and wherein the isocyanate compound on which the parting agent is based is also aromatic.

Preferred organic di- or polyisocyanate include methylenediphenyl diisocyanate isomers such as 2,4'-MDI, 4,4'-MDI, 2,2'-MDI. A suitable isocyanate compound is Lupranate® MI, which is a mixture of 2,4' and 4,4'-MDI isomers, available from BASF Corporation. Another preferred organic di- or polyisocyanate is polymeric MDI. Mixtures of the above preferred di- or polyisocyanates may also be used. A particularly preferred polyisocyanate comprises polymeric MDI. A useful commercially available polymeric MDI material is Lupranate® M20S isocyanate sold by BASF Corporation.

EXAMPLES

Example 1 below describes the synthesis of a parting agent wherein the isocyanate compound is a mixture of diphenylmethane diisocyanate isomers, R comprises dialkaryl, Y is hydroxyl, and n is about 10. Example 2 describes the synthesis of a parting agent wherein the isocyanate compound is a mixture of diphenylmethane diisocyanate isomers, R comprises trisiloxane, and Y is hydroxyl. Example 3 demonstrates formation of a parting agent wherein the hydrophobic group is an alkaryl. Example 4 is similar to Example 3 with the addition of a catalyst.

Lupranate® MI isocyanate is a mixture of diphenylmethylene diisocyanates sold by BASF Corporation. Macol® DNP-10 is an average 10 mole ethoxylate of dinonylphenol, and Iconol® NP-6 is an average 6 mole ethoxylate of nonylphenol; they are commercially available from BASF Corporation.

In any of the reactions the order of addition of the components can be changed without altering the product.

Example 1

Synthesis of an Internal Parting Agent where the Hydrophobic Group is Dialkaryl

Macol® D DNP-10 surfactant (428.4 g) is placed in a one liter two neck flask and heated to 45° C. With continuous agitation, Lupranate® MI isocyanate (71.6 g) is added dropwise over a period of an hour. The temperature is increased to 80° C. and the reaction is continued for 20 to 24 hours. Titration of remaining free NCO groups shows a % free NCO of about 0.5%. The temperature is maintained for an additional one hour, the reaction mixture is cooled to room temperature and allowed to stand overnight. Titration of free NCO after the overnight period shows the reaction is complete—that is, the measured free NCO is 0.1%, which is within the error of the method of detection.

Example 2

Synthesis of an Internal Parting Agent where the Hydrophobic Group is Silicon

Masil® SF-19 surfactant (423 g) is placed in a one liter three neck flask and heated to 80° C. with continuous agitation provided by an overhead stirrer. Lupranate® MI isocyanate (77 g) is added dropwise over a period of about 30 minutes. The temperature is increased to 90° C. and the reaction is continued for 20–24 hours, after which time the % free NCO is determined by titration and found to be about 0.5%. The reaction is continued for an additional 2 hours at 90° C., the reaction mixture is cooled to room temperature and allowed to stand overnight. Titration of free NCO shows the reaction is complete.

Example 3

Synthesis of an Internal Parting Agent where the Hydrophobic Group is Alkaryl.

Iconol® NP-6 (393.5 g) is placed in a one liter two neck flask and heated to 45° C. With continuous agitation, Lupranate® MI (106.5 g) is added dropwise over a period of one hour. The temperature is increased to 80° C. and the reaction is continued for 20 to 24 hours. Titration of remaining free NCO groups shows a % free NCO of about 0.5%. The temperature is maintained for an additional one hour, the reaction mixture is cooled to room temperature and allowed to stand overnight. Titration of NCO the following morning shows the free NCO is 0.1%, which is within the error of the method, thus the reaction is complete.

Example 4

Synthesis of an Internal Parting Agent where the Hydrophobic Group is Alkaryl.

Lupranate® MI (106.5 g) is placed in a one liter two neck flask and heated to 45° C. With continuous agitation, Iconol® NP-6 (393.5 g) and 20 ppm of the urethane catalyst DABCO T-12 is added dropwise over a period of an hour. The temperature is increased to 80° C. and the reaction is continued for 9 hours. Titration of remaining free NCO groups shows a % free NCO of about 0.5%. The temperature is maintained for an additional one hour, the reaction mixture is cooled to room temperature and allowed to stand overnight. Titration of NCO the following morning shows the free NCO is 0.1%, which is within the error of the method, thus the reaction is complete.

Procedure For Evaluation Of Internal Press Release Agent

The following procedure was used to test the parting agents of the present invention prepared as in Examples 1–3. Results of the experiments are given in Table 1 below.

1. The stainless steel caul plates are preconditioned with external mold release (i.e. spray a dilute solution of external press release on the caul plate, then wipe off the excess with a paper towel). In the Examples, XCTW-9495, a water based organosiloxane was used as the external mold release.
2. Raw material (wood fiber, wood flake, wood particle, saw dust, etc.) is blended with a binder resin comprising Lupranate® M20SB, which is a polymeric MDI sold by BASF Corporation, a parting agent prepared according to the present invention, and, optionally, a synergist component to form a furnish material. The optional synergists include the lower N-alkyl pyrrolidones. In general, the $C_1$–$C_4$ N-alkylpyrrolidones are usefuil in the present invention, with the preferred N-alkyl pyrrolidone being N-methyl-2-pyrrolidone (NMP). Other useful synergists include gamma-butyrolactone. Mixtures of the above synergists can also be used to form the synergist component. The synergist component can be combined with the polyisocyanate component in an amount of from 0.5 to 25 weight percent based on the total weight of the binder resin. More preferably, the binder resin includes from about 0.5 to 15 weight percent, and most preferably from about 0.5 to 10 weight percent synergist based on the total weight of the binder resin.
3. The parting agent and synergist used, are reported in the Examples as weight percent based on the total weight of the binder resin. Between 2.5% and 10% by weight binder resin is used, based on the total weight of the raw material lignocellulosic particles. The amount used is reported in the Examples. In the Examples, the lignocellulosic particles are either sawdust or medium density fibers (MDF).
4. A form is used to set the desired size of the board, the furnish material is layered on the bottom caul plate. In the Examples, a 6 inch by 11 inch aluminum form is used. The caul plate is transferred into the press and covered with another preconditioned caul plate.
5. The material is pressed under heat and pressure to produce a board using typical conditions. Pressing time and temperature vary with board thickness and the raw material. In the Examples, the boards are pressed for 2 minutes at 350° F. and 520 psi. The press is opened and the caul plates and board are removed from the press.
6. A successful event is one after which the board (a) is readily removed from the caul plates without difficulty, (b) without leaving residue on the caul plates and (c) without causing surface imperfections on the board resulting from sticking.
7. Repeat steps 2–5 using the same set of caul plates without applying any additional external press release.
8. The number of boards successfully made is a measure of the performance of the parting agent. The higher the number, the better the parting agent. The percent binder resin used is a weight percent based on the total weight of the raw material.

TABLE 1

| Example | Raw material | Parting agent in binder resin | Wt. % parting agent in binder resin | Wt. % binder used | Wt. % synergist in the binder resin | # of boards pressed |
|---|---|---|---|---|---|---|
| 1 | MDF | Example 3 | 10 | 4 | none | 5 |
| 2 | MDF | Example 2 | 10 | 4 | none | 9 |
| 3 | MDF | Example 2 | 10 | 4 | 10% NMP | 6 |
| 4 | MDF | Example 2 | 5 | 4 | 5% NMP | 6 |
| 5 | Sawdust | Example 1 | 5 | 4 | none | 7 |
| 6 | MDF | Example 1 | 5 | 4 | 5% NMP | 12 |
| 7 | MDF | None | 0 | 4 | none | 1 |

Example 7 is a control where no parting agent was used in the binder resin. With no parting agent, only one board could be pressed before re-applying the external release agent. Examples 1–6 show that the parting agents of the present invention impart desirable properties to the binder resins of the present invention, in that their use in the binder resins enables 5 to 12 boards to be pressed without re-application of the external release agent.

In addition, all binder resins in Examples 1–6 are of a single phase and homogenous, indicating that the parting agent is compatible with the di- or polyisocyanate, and that the binder resins are stable.

We claim:
1. A process for producing a parting agent, comprising the steps of:
   a) providing an isocyanate compound and an isocyanate-reactive compound of the general structure

$R(ao)_nY$ in stoichiometrically equivalent amounts; wherein
   R is a hydrophobic group containing alkyl, alkaryl, polyaryl, or siloxane moieties and wherein the alkyl moieties comprise straight chain or branched hydrocarbons with 6 or more carbon atoms, the alkaryl moieties comprise monoalkyl, dialkyl, or trialkyl substituted aromatic hydrocarbons with 9 or more carbon atoms, the polyaryl moieties comprise a polyphenyl structure that is either alkyl substituted or unsubstituted, and the siloxane moieties comprise a trisiloxane or higher polysiloxane;
   (ao) is an alkylene oxide or mixture of alkylene oxides selected from the group consisting of ethylene oxide, propylene oxide, butylene oxide, and mixtures thereof;
   n is from about 1 to about 25; and
   Y represents a monofunctional isocyanate-reactive group
   b) reacting the isocyanate compound and the isocyanate reactive-compound at a first temperature until the isocyanate number is at an intermediate level;
   c) thereafter, adding a second charge of an isocyanate compound; and
   d) reacting the second charge of isocyanate compound and the isocyanate reactive-compound at a second temperature higher than the first temperature for a time sufficient to react substantially all of the isocyanate groups.
2. The process according to claim 1, wherein step c) comprises adding the second charge of an isocyanate compound in an amount of about 1 to 10 weight percent, based on the weight of the isocyanate compound charged in step a).

3. The process according to claim 1, wherein step a) comprises providing a polyisocyanate and an isocyanate-reactive compound wherein Y comprises a hydroxyl group.

4. A process for producing a parting agent, comprising the steps of:
   a) providing an isocyanate compound and an isocyanate-reactive compound of general structure $R(ao)_n\text{-}Y$ wherein: R is a hydrophobic group containing alkyl, alkaryl, polyaryl, or siloxane moieties and wherein the alkyl moieties comprise straight chain or branched hydrocarbons with 6 or more carbon atoms, the alkaryl moieties comprise monoalkyl, dialkyl, or trialkyl substituted aromatic hydrocarbons with 9 or more carbon atoms, the polyaryl moieties comprise a polyphenyl structure that is either alkyl substituted or unsubstituted, and the siloxane moieties comprise a trisiloxane or higher polysiloxane;

(ao) is an alkylene oxide or mixture of alkylene oxides selected from the group consisting of ethylene oxide, propylene oxide, butylene oxide, and mixtures thereof;

n is from about 1 to about 25; and

Y represents a monofunctional isocyanate-reactive group in amounts such that the molar ratio of the isocyanate compound to $R(ao)_n\text{-}Y$ is greater than 1:1;

b) reacting the two compounds at a first temperature until substantially all of the $R(ao)_n\text{-}Y$ has reacted;

c) thereafter, reacting at a second temperature higher than the first temperature until substantially all of the excess isocyanate groups have reacted.

5. The process according to claim 4, wherein an allophanate catalyst is added to the components in step a).

6. The process according to claim 4, wherein an allophanate catalyst is added to the components after step b) and before step c).

* * * * *